(12) United States Patent
Li et al.

(10) Patent No.: US 12,199,299 B1
(45) Date of Patent: Jan. 14, 2025

(54) BATTERY PACK AND ENERGY STORAGE DEVICE

(71) Applicants: Shenzhen Hithium Energy Storage Control Technology Co., Ltd., Shenzhen (CN); Xiamen Hithium Energy Storage Technology Co., Ltd., Fujian (CN)

(72) Inventors: Yongqiang Li, Fujian (CN); Deliang Zhong, Fujian (CN)

(73) Assignee: SHENZHEN HITHIUM ENERGY STORAGE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/748,854

(22) Filed: Jun. 20, 2024

(30) Foreign Application Priority Data

Aug. 14, 2023 (CN) .......................... 202311017106.8

(51) Int. Cl.
| | |
|---|---|
| *H01M 10/6556* | (2014.01) |
| *H01M 10/613* | (2014.01) |
| *H01M 10/6568* | (2014.01) |
| *H01M 50/242* | (2021.01) |
| *H01M 50/244* | (2021.01) |

(52) U.S. Cl.
CPC ....... *H01M 50/242* (2021.01); *H01M 10/613* (2015.04); *H01M 10/6556* (2015.04); *H01M 10/6568* (2015.04); *H01M 50/244* (2021.01)

(58) Field of Classification Search
CPC ............. H01M 50/242; H01M 10/613; H01M 10/6556; H01M 10/6568; H01M 50/244
See application file for complete search history.

(56) References Cited

U.S. PATENT DOCUMENTS

| | | | |
|---|---|---|---|
| 2014/0332085 A1 | 11/2014 | Grace et al. | |
| 2022/0042613 A1* | 2/2022 | Arteta Unanua | ..... F16K 31/001 |
| 2023/0123699 A1* | 4/2023 | Miao | ................... H01M 50/204 |
| | | | 429/71 |

FOREIGN PATENT DOCUMENTS

| | | |
|---|---|---|
| CN | 208352482 U | 1/2019 |
| CN | 213459871 U | 6/2021 |
| CN | 214227089 U | 9/2021 |
| CN | 214227100 U | 9/2021 |
| CN | 214411396 U | 10/2021 |
| CN | 217468573 U | 9/2022 |
| CN | 218005154 U | 12/2022 |
| EP | 3951225 A1 | 2/2022 |
| KR | 20190140645 A | 12/2019 |

OTHER PUBLICATIONS

Notice of Allowance dated Nov. 29, 2023 issued in CN 202311017106.8.

* cited by examiner

*Primary Examiner* — Muhammad S Siddiquee
(74) *Attorney, Agent, or Firm* — Scully, Scott, Murphy & Presser, P.C.

(57) ABSTRACT

Disclosed are a battery pack and an energy storage device. The battery pack includes a box, a battery module, a liquid cooling plate, a connection valve, a liquid supply pipe and a protection structure. The box is provided with an accommodation cavity and a mounting hole communicating with the accommodation cavity. The battery module is provided in the accommodation cavity. The liquid cooling plate is provided in the accommodation cavity and configured for cooling the battery module. The connection valve is provided in the mounting hole, and one end of the connection valve located outside the accommodation cavity is configured for connecting to a cooling cabinet. The liquid supply pipe is communicated with the liquid cooling plate and one end of the connection valve facing the accommodation cavity. The protection structure is detachably provided in the box, is located outside the accommodation cavity, and covers the connection valve.

20 Claims, 3 Drawing Sheets

BATTERY PACK AND ENERGY STORAGE DEVICE

CROSS-REFERENCE TO RELATED APPLICATION

The present application is based upon and claims the benefit of priority to Chinese Patent Application No. 202311017106.8, filed on Aug. 14, 2023, the entire contents of which are incorporated herein by reference for all purposes.

TECHNICAL FIELD

The present disclosure relates to the technical field of energy storage, and in particular, to a battery pack and an energy storage device.

BACKGROUND

In the related art, the battery module in the battery pack is usually cooled using an air cooling method or a liquid cooling method. The liquid cooling method is to arrange a liquid cooling plate in the battery pack, and connect the liquid cooling plate to an external cooling cabinet using a connection valve, so as to achieve cooling of the battery module.

SUMMARY

In a first aspect, an embodiment of the present disclosure discloses a battery pack. The battery pack includes a box, a battery module, a liquid cooling plate, a connection valve, a liquid supply pipe and a protection structure. The box is provided with an accommodation cavity and a mounting hole. The mounting hole is communicated with the accommodation cavity. The battery module is provided in the accommodation cavity. The liquid cooling plate is provided in the accommodation cavity. The liquid cooling plate is configured for cooling the battery module. The connection valve is provided in the mounting hole. One end of the connection valve outside the accommodation cavity is configured for connecting to a cooling cabinet. The liquid supply pipe is communicated with the liquid cooling plate and one end of the connection valve facing the accommodation cavity. The protection structure is detachably provided in the box. The protection structure is located outside the accommodation cavity, and covers the connection valve.

In a second aspect, an embodiment of the present disclosure discloses an energy storage device. The energy storage device includes the battery pack disclosed in the first aspect.

BRIEF DESCRIPTION OF THE DRAWINGS

In order to more clearly illustrate the technical solutions in the embodiments of the present disclosure, the drawings required in the embodiments will be briefly introduced below. Obviously, the drawings in the following description are only some embodiments of the present disclosure. Those of ordinary skill in the art can also obtain other drawings based on these drawings without exerting creative efforts.

EXPLANATION OF MAIN REFERENCE SIGNS

Figure 1:
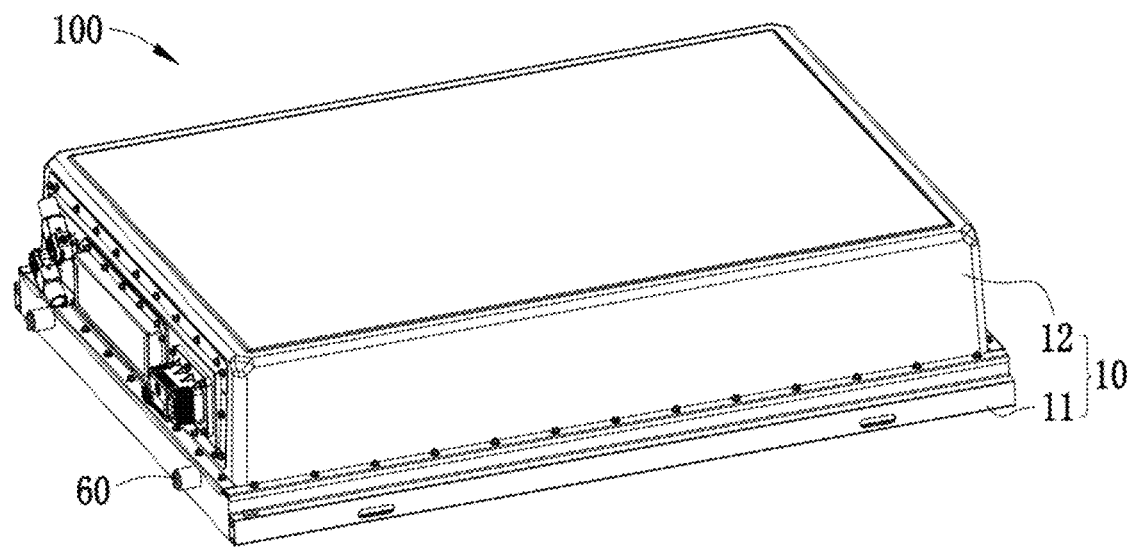
FIG. 1 is a schematic structural view of a battery pack disclosed in the first embodiment of the present disclosure.

100. Battery pack; 10. Box; 10a. Accommodation cavity; 10b. Mounting hole; 10c. Positioning groove; 11. Base; 11a. Bottom plate; 11b. Side plate; 12. Cover; 20. Battery module; 30. Liquid cooling plate; 40. Connection valve; 40a, Limiting portion; 50. Liquid supply pipe; 60. Protection structure; 61. First protection member; 61a. Open end; 61b. First clamping part; 62. Second protection member; 62a. Second clamping part; 62b. Handle part; 70. Connector; 80. Sealing member; 200. Energy storage device.

DETAILED DESCRIPTION

The technical solutions in the embodiments of the present disclosure will be clearly and completely described below with reference to the accompanying drawings in the embodiments of the present disclosure. Obviously, the described embodiments are only some, not all, of the embodiments of the present disclosure. Based on the embodiments of the present disclosure, all other embodiments obtained by those of ordinary skill in the art without creative efforts fall within the scope of protection of the present disclosure.

In the present disclosure, the orientations or positional relationships indicated by the terms "on", "under", "left", "right", "front", "back", "top", "bottom", "inner", "outer", "middle", "vertical", "horizontal", "transverse", "longitudinal", etc. are based on the orientations or positional relationships shown in the drawings. These terms are mainly used to better describe the present disclosure and its embodiments and are not intended to limit the indicated apparatus, element or component to having a specific orientation, or to be constructed and operated in a specific orientation.

Moreover, some of the above terms may also be used to express other meanings in addition to indicating orientation or positional relationships. For example, the term "on" may also be used to express a certain dependence relationship or connection relationship in some cases. For those of ordinary skill in the art, the specific meanings of these terms in the present disclosure can be understood according to specific circumstances.

In addition, the terms "mount", "arrange", "provide", "connect", and "link" are to be construed broadly. For example, they may be a fixed connection, a detachable connection, or an integral construction; they may be a mechanical connection or an electrical connection; they may be a direct connection, or indirect connection through an intermediate medium, or internal connectivity between two apparatuses, elements or components. For those of ordinary skill in the art, the specific meanings of the above terms in the present disclosure can be understood according to specific circumstances.

In addition, the terms "first", "second", etc. are mainly used to distinguish different apparatuses, elements or components (the specific types and constructions may be the same or different), and are not used to indicate or imply the relative importance and number of the indicated apparatuses, elements or components. Unless otherwise stated, "a plurality of" means two or more.

In order to connect the liquid cooling plate to the external cooling cabinet, the connection valve is partially located outside the box of the battery pack. During the production and transportation of the battery pack, the connection valve is easily cracked or even broken due to external forces, which leads to the abnormal use of the battery pack.

The present disclosure discloses a battery pack and an energy storage device. The protection structure is used to protect the connection valve to prevent the connection valve from being cracked or even broken due to external force, thereby ensuring the normal use of the battery pack.

First Embodiment

Figure 2:
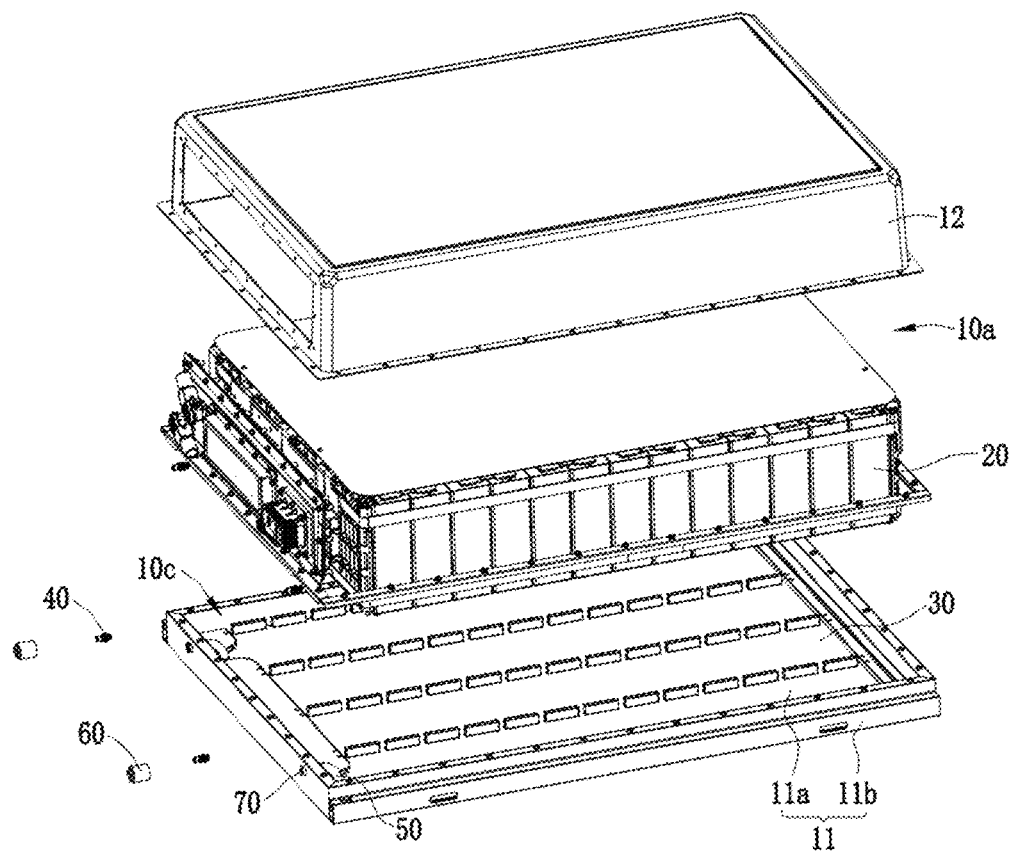
FIG. 2 is a schematic view of an exploded structure of the battery pack disclosed in the first embodiment of the present disclosure.
Figure 3:
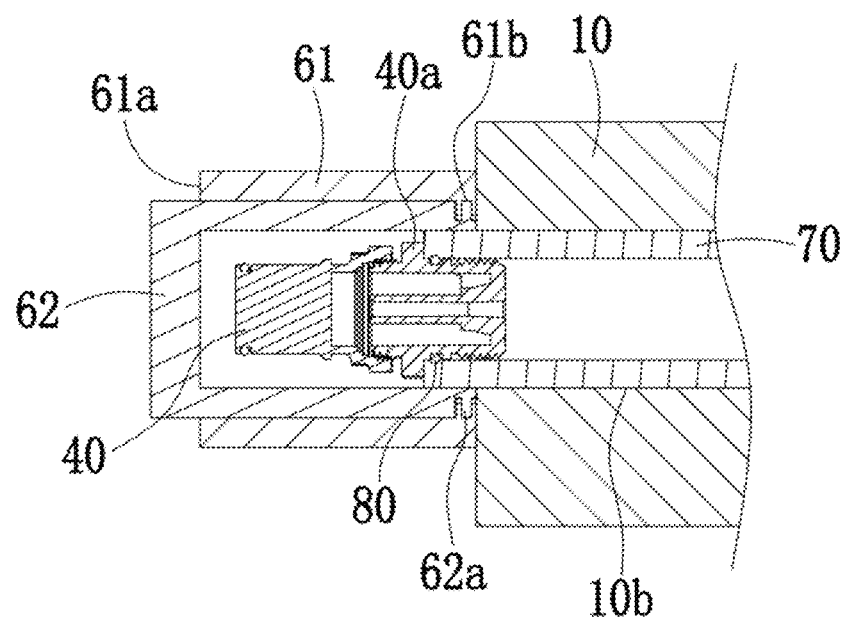
FIG. 3 is a partial cross-sectional structural schematic view of the battery pack disclosed in the first embodiment of the present disclosure.
Figure 4:
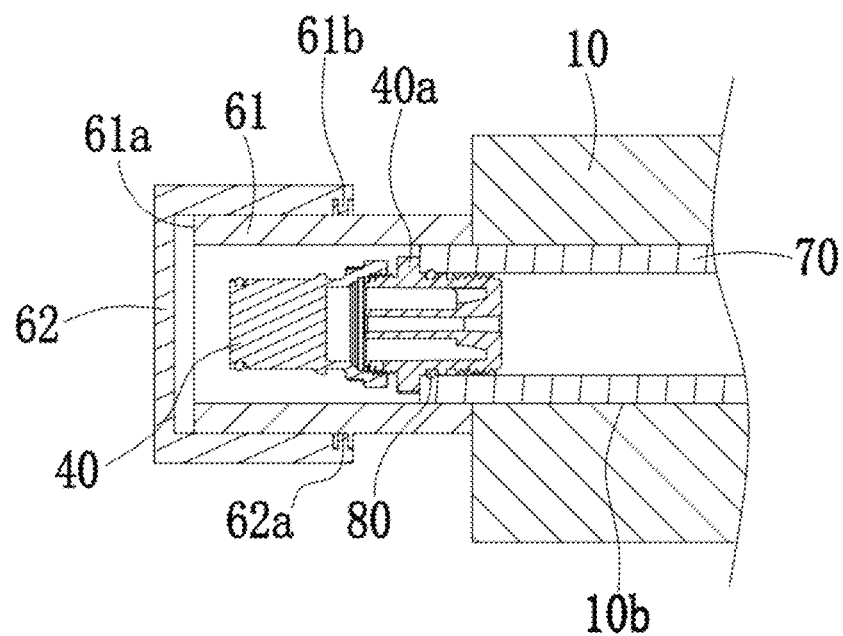
FIG. 4 is a partial cross-sectional structural schematic view of another battery pack disclosed in the first embodiment of the present disclosure.
Figure 5:
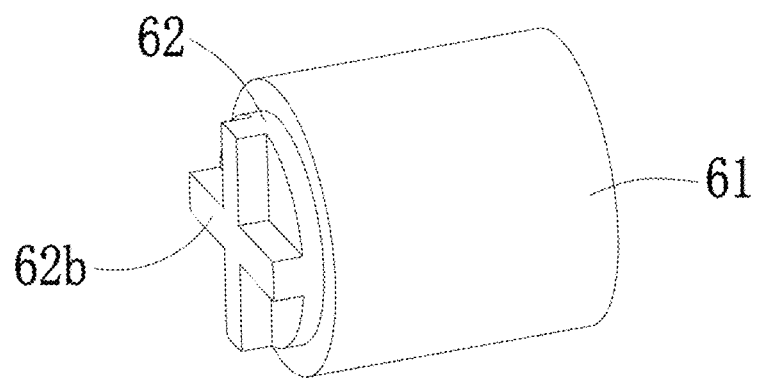
FIG. 5 is a schematic structural view of a protection structure disclosed in the first embodiment of the present disclosure.

Referring to FIGS. 1 to 3, which are schematic structural views of a battery pack 100 provided in the first embodiment of the present disclosure, the battery pack 100 includes a box 10, a battery module 20, a liquid cooling plate 30, a connection valve 40, a liquid supply pipe 50 and a protection structure 60. The box 10 is provided with an accommodation cavity 10a and a mounting hole 10b. The mounting hole 10b is communicated with the accommodation cavity 10a. The battery module 20 is provided in the accommodation cavity 10a. The liquid cooling plate 30 is provided in the accommodation cavity 10a, and the liquid cooling plate 30 is used for cooling the battery module 20. The connection valve 40 is provided in the mounting hole 10b. One end of the connection valve 40 that is located outside the accommodation cavity 10a is used for connecting to a cooling cabinet. The liquid supply pipe 50 is communicated with the liquid cooling plate 30 and one end of the connection valve 40 facing the accommodation cavity 10a. The protection structure 60 is detachably provided in the box 10. The protection structure 60 is located outside the accommodation cavity 10a and covers the connection valve 40.

The connection valve 40 may be a stop valve or other types of valve bodies, which may be selected according to actual conditions, and is not specifically limited in this embodiment.

In this embodiment, the battery module 20 and the liquid cooling plate 30 are arranged in the accommodation cavity 10a of the box 10. The connection valve 40 is arranged in the mounting hole 10b of the box 10. The mounting hole 10b is used to communicate with the accommodation cavity 10a, so that the liquid supply pipe 50 can be connected to the liquid cooling plate 30 and the connection valve 40, and the connection valve 40 is connected to the cooling cabinet. Therefore, the liquid cooling plate 30 cools the battery module 20. At the same time, the protection structure 60 is detachably disposed on the box 10 and is used to cover the connection valve 40 to protect the connection valve 40, for preventing the connection valve 40 from being cracked or even broken due to external force, thereby ensuring the normal use of the battery pack 100, especially protecting the connection valve 40 during production and transportation of the battery pack 100. When the liquid cooling plate 30 needs to work, the protection structure 60 can be detached from the box 10 to expose the connection valve 40, so that the end of the connection valve 40 located outside the accommodation cavity 10a may be connected to the cooling cabinet.

In some embodiments, the protection structure 60 includes a first protection member 61 and a second protection member 62. The first protection member 61 is connected to the box 10 and is arranged around a periphery of the connection valve 40. The first protection member 61 is provided with an open end 61a corresponding to the connection valve 40. The second protection member 62 is detachably connected to the first protection member 61 and closes the open end 61a. In this way, through the cooperation of the first protection member 61 and the second protection member 62, the first protection member 61 protects the circumferential portion of the connection valve 40, and the second protection member 62 closes the open end 61a, thereby protecting the connection valve 40 from the orientation direction of the end of the connection valve 40 that is located outside the accommodation cavity 10a. Moreover, the second protection member 62 can be detached from the first protection member 61. At this time, the end of the connection valve 40 that is located outside the accommodation cavity 10a can be connected to the cooling cabinet, and the first protection member 61 can continue to protect the circumferential portion of the connection valve 40.

As an optional implementation, the outer peripheral surface of the second protection member 62 is detachably connected to the inner peripheral surface of the first protection member 61, and the second protection member 62 is located between the first protection member 61 and the connection valve 40, and covers the connection valve 40. In this way, on the one hand, the first protection member 61 can provide a connection position for the second protection member 62, so that the second protection member 62 is detachably connected to the box 10. Additionally, the detachable connection structure is located between the inner peripheral surface of the first protection member 61 and the outer peripheral surface of the second protection member 62, so that the detachable connection structure can be hidden. On the other hand, the second protection member 62 covers the connection valve 40, thereby protecting the connection valve 40 in all directions. Additionally, the first protection member 61 located on the outer peripheral side of the second protection member 62 can provide double protection. Additionally, after the second protection member 62 is detached from the box 10, the first protection member 61 can also protect the connection valve 40.

As another optional implementation, the inner peripheral surface of the second protection member 62 is detachably connected to the outer peripheral surface of the first protection member 61, and the second protection member 62 covers the open end 61a. In this way, on the one hand, the first protection member 61 can provide a connection position for the second protection member 62, so that the second protection member 62 can be detachably connected to the box 10. On the other hand, the connection valve 40 is protected in all directions by the second protection member 62 and the first protection member 61. The length of the second protection member 62 may be set smaller than the first protection member 61, thereby saving material and reducing weight, and reducing the difficulty of assembly and disassembly operations of the second protection member 62. Additionally, after the second protection member 62 is detached from the box 10, the first protection member 61 can also protect the connection valve 40.

In some embodiments, the first protection member 61 is provided with a first clamping part 61b, the second protection member 62 is provided with a second clamping part 62a, and the second clamping part 62a is detachably connected to the first clamping part 61b. In this way, the second clamping part 62a and the first clamping part 61b are detachably connected with each other, which can reduce the difficulty of assembling and disassembling the second protecting member 62 and the first protecting member 61.

Optionally, one of the first clamping part 61*b* and the second clamping part 62*a* is provided with a convex portion, and the other is provided with a concave portion. The second protecting member 62 can rotate relative to the first protecting member 61 so that the convex portion and the concave portion are engaged or separated. In this way, the second protection member 62 moves along the length direction to cooperate with the first protection member 61, so that the convex portion and the concave portion are at the same position in the length direction. At this time, the second protection member 62 can be rotated to engage the convex portion with the concave portion, therefore the second protection member 62 can be assembled with the first protection member 61. When the second protection member 62 is rotated to separate the convex portion from the concave portion, the second protection member 62 can be moved along the length direction to be detached from the first protection member 61, so that the connection valve 40 is exposed to facilitate the connection between the connection valve 40 and the cooling cabinet.

In some embodiments, a handle portion 62*b* is provided at an end of the second protection member 62 away from the box 10, and the handle portion 62*b* is used for the user to rotate the second protection member 62. In this way, the handle portion 62*b* is used to provide a force application site for the user, and the user can assemble and disassemble the second protection member 62 and the first protection member 61 by rotating the second protection member 62, and the operation difficulty is relatively low.

Optionally, the first protection member 61 is made of a flexible material, and the second protection member 62 is made of a hard material. For example, the first protection member 61 may be made of a foam, which has a buffering effect and can buffer external forces and reduce impacts. The second protection member 62 may be made of a material with relatively high hardness such as metal or plastic, which can provide good protection for the connection valve 40.

Exemplarily, the battery pack 100 further includes a connector 70, which is provided in the mounting hole 10*b*. One end of the connector 70 protrudes into the accommodation cavity 10*a* and is connected to the liquid supply pipe 50, and the other end of the connector 70 protrudes out of the mounting hole 10*b* and is connected to the connection valve 40. In this way, one end of the connector 70 is connected to the connection valve 40 and the other end is connected to the liquid supply pipe 50, so that the connection valve 40 and the liquid supply pipe 50 can be connected.

In some embodiments, a sealing member 80 is provided between the connection valve 40 and the liquid supply pipe 50, and the sealing member 80 is used to seal the connection between the connection valve 40 and the liquid supply pipe 50. In this way, the sealing member 80 is used to seal the connection between the connection valve 40 and the liquid supply pipe 50, which can prevent liquid leakage and prevent foreign matter from entering the connection valve 40 and the liquid supply pipe 50 through the connection and causing damage to the entire cooling system.

Exemplarily, a limiting portion 40*a* is provided on the peripheral side of the connection valve 40, and the limiting portion 40*a* abuts against the outer surface of the box 10 along the extending direction of the mounting hole 10*b*. In this way, by abutting the limiting portion 40*a* against the outer surface of the box 10, the extending length of the connection valve 40 into the mounting hole 10*b* can be limited, thereby preventing the connection valve 40 from excessively extending into the mounting hole 10*b* to affect the installation of component(s) in the accommodation cavity 10*a* or interfering with component(s) in the accommodation cavity 10*a* to cause damage.

In some embodiments, the box 10 includes a base 11 and a cover 12. The cover 12 covers and is connected to the base 11 to form the accommodation cavity 10*a*. The mounting hole 10*b* is provided in the base 11. The liquid cooling plate 30 is provided in the base 11. The battery module 20 is carried on the liquid cooling plate 30. In this way, by the cover 12 covering the base 11, the accommodation cavity 10*a* can be formed therebetween, so as to facilitate the installation of the battery module 20 and the liquid cooling plate 30 and provide an installation space for them. Moreover, the cover 12 can be detached from the base 11 to perform maintenance, replacement and other operations on the component(s) in the accommodation cavity 10*a*.

Exemplarily, the base 11 includes a bottom plate 11*a* and a plurality of side plates 11*b*. The plurality of side plates 11*b* are provided on the bottom plate 11*a* and are connected end to end so as to form a positioning groove 10*c* with the bottom plate 11*a*. The liquid cooling plate 30 is provided in the positioning groove 10*c*. The battery module 20 is partially located in the positioning groove 10*c* for positioning. The cover 12 covers and is connected to the plurality of side plates 11*b*. The accommodation cavity 10*a* is formed between the cover 12 and the positioning groove 10*c*. In this way, the liquid cooling plate 30 can be accommodated by the positioning groove 10*c*, and the battery module 20 can be pre-positioned to facilitate the assembly of the battery module 20.

Optionally, the base plate 11*a* and the liquid cooling plate 30 are an integrally molded piece, or the base plate 11*a* and the liquid cooling plate 30 are two independent pieces connected to each other. When the base plate 11*a* and the liquid cooling plate 30 are formed as one integrated piece, the overall thickness and weight of the battery pack 100 can be reduced. When the base plate 11*a* and the liquid cooling plate 30 are two independent pieces connected to each other, they can be assembled or disassembled, especially when the liquid cooling plate 30 needs to be replaced, the replacement is less difficult.

In this embodiment, as shown in FIG. 2, the bottom plate 11*a* and the liquid cooling plate 30 are integrally molded piece. In FIG. 2, reference signs 11*a* and 30 are the same component, that is, the bottom plate 11*a* and the liquid cooling plate 30.

The first embodiment of the present disclosure provides a battery pack 100. The battery module 20 and the liquid cooling plate 30 are provided in the accommodation cavity 10*a* of the box 10, the mounting hole 10*b* of the box 10 is provided with the connection valve 40, and the mounting hole 10*b* is used to communicate with the accommodation cavity 10*a*, so that the liquid supply pipe 50 can connect the liquid cooling plate 30 and the connection valve 40, thereby connecting with the cooling cabinet using the connection valve 40, and thus the liquid cooling plate 30 can cool the battery module 20. At the same time, the protection structure 60 is detachably disposed on the box 10 and is used to cover the connection valve 40 to protect the connection valve 40, preventing the connection valve 40 from being cracked or even broken due to external force, thereby ensuring the normal use of the battery pack 100, especially protecting the connection valve 40 during production and transportation of the battery pack 100. When the liquid cooling plate 30 needs to work, the protection structure 60 can be detached from the box 10 to expose the connection valve 40, so that the end of the connection valve 40 located outside the accommodation cavity 10a is connected to the cooling cabinet.

Second Embodiment

Figure 6:
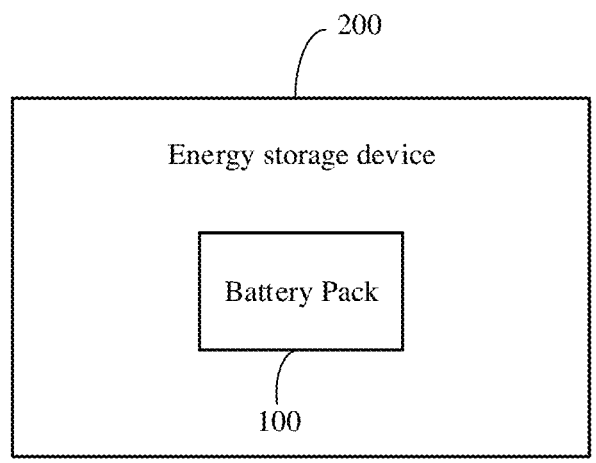
FIG. 6 is a schematic structural view of an energy storage device disclosed in the second embodiment of the present disclosure.

Referring to FIG. 6, which is a schematic structural view of an energy storage device 200 provided in the second embodiment of the present disclosure. The energy storage device 200 includes the battery pack of the first embodiment.

The energy storage device 200 may be a household energy storage cabinet or an energy storage box in the form of a small container, which is not specifically limited in this embodiment.

Optionally, the energy storage device 200 may include one or more battery packs 100. For example, in some implementations, the number of battery packs 100 in the energy storage device 200 may be 1, 2, 3, 4, etc., which is not specifically limited in this embodiment.

Furthermore, when the energy storage device 200 includes a plurality of battery packs 100, the plurality of battery packs 100 may be connected in series or in parallel, which is not specifically limited in this embodiment.

The second embodiment of the present disclosure provides an energy storage device 200 in which the battery pack 100 can protect the connection valve using a protection structure, to prevent the connection valve from being cracked or even broken due to external force, thereby ensuring the normal use of the battery pack.

The battery pack and the energy storage device disclosed in the embodiments of the present disclosure have been introduced in detail above. The present disclosure illustrates the principles and implementations of the present disclosure by using examples. The description of the above embodiments is only used to help understand the battery pack and the energy storage device of the present disclosure and core ideas thereof. At the same time, for those of ordinary skill in the field, there may be changes in the specific implementation and application scope based on the ideas of the present disclosure. In summary, the contents of this specification should not be understood as limitations of the present disclosure.

What is claimed is:

1. A battery pack, comprising:
   a box, wherein the box is provided with an accommodation cavity and a mounting hole, and the mounting hole is communicated with the accommodation cavity;
   a battery module, wherein the battery module is provided in the accommodation cavity;
   a liquid cooling plate, wherein the liquid cooling plate is provided in the accommodation cavity, and the liquid cooling plate is configured for cooling the battery module;
   a connection valve, wherein the connection valve is provided in the mounting hole, and one end of the connection valve that is located outside the accommodation cavity is configured for connecting to a cooling cabinet;
   a liquid supply pipe, wherein the liquid supply pipe is communicated with the liquid cooling plate and one end of the connection valve facing the accommodation cavity; and
   a protection structure, wherein the protection structure comprises a first protection member and a second protection member, the first protection member is connected to the box, the first protection member is arranged around a periphery of the connection valve, the first protection member is provided with an open end corresponding to the connection valve, and the second protection member is detachably connected to the first protection member and closes the open end.

2. The battery pack according to claim 1, wherein an outer peripheral surface of the second protection member is detachably connected to an inner peripheral surface of the first protection member, and the second protection member is located between the first protection member and the connection valve and covers the connection valve.

3. The battery pack according to claim 1, wherein an inner peripheral surface of the second protection member is detachably connected to an outer peripheral surface of the first protection member, and the second protection member covers the open end.

4. The battery pack according to claim 1, wherein the first protection member is provided with a first clamping part, the second protection member is provided with a second clamping part, and the second clamping part is detachably connected to the first clamping part.

5. The battery pack according to claim 2, wherein the first protection member is provided with a first clamping part, the second protection member is provided with a second clamping part, and the second clamping part is detachably connected to the first clamping part.

6. The battery pack according to claim 3, wherein the first protection member is provided with a first clamping part, the second protection member is provided with a second clamping part, and the second clamping part is detachably connected to the first clamping part.

7. The battery pack according to claim 4, wherein one of the first clamping part and the second clamping part is provided with a convex portion, the other of the first clamping part and the second clamping part is provided with a concave portion, and the second protection member can rotate relative to the first protection member to engage the convex portion with or separate the convex portion from the concave portion.

8. The battery pack according to claim 7, wherein one end of the second protection member facing away from the box is provided with a handle portion, and the handle portion is configured for a user to rotate the second protection member.

9. The battery pack according to claim 1, wherein the battery pack further comprises a connector, the connector is provided in the mounting hole, one end of the connector protrudes into the accommodation cavity and is connected to the liquid supply pipe, and the other end of the connector protrudes out of the mounting hole and is connected to the connection valve.

10. The battery pack according to claim 2, wherein the battery pack further comprises a connector, the connector is provided in the mounting hole, one end of the connector protrudes into the accommodation cavity and is connected to the liquid supply pipe, and the other end of the connector protrudes out of the mounting hole and is connected to the connection valve.

11. The battery pack according to claim 3, wherein the battery pack further comprises a connector, the connector is provided in the mounting hole, one end of the connector protrudes into the accommodation cavity and is connected to the liquid supply pipe, and the other end of the connector protrudes out of the mounting hole and is connected to the connection valve.

12. The battery pack according to claim 1, wherein a sealing member is provided between the connection valve and the liquid supply pipe, and the sealing member is configured for sealing a connection between the connection valve and the liquid supply pipe.

13. The battery pack according to claim 2, wherein a sealing member is provided between the connection valve and the liquid supply pipe, and the sealing member is configured for sealing a connection between the connection valve and the liquid supply pipe.

14. The battery pack according to claim 3, wherein a sealing member is provided between the connection valve and the liquid supply pipe, and the sealing member is configured for sealing a connection between the connection valve and the liquid supply pipe.

15. The battery pack according to claim 1, wherein a limiting portion is provided on a peripheral side of the connection valve, and the limiting portion abuts against an outer surface of the box along an extension direction of the mounting hole.

16. The battery pack according to claim 2, wherein a limiting portion is provided on a peripheral side of the connection valve, and the limiting portion abuts against an outer surface of the box along an extension direction of the mounting hole.

17. The battery pack according to claim 1, wherein the box comprises a base and a cover, the cover covers and is connected to the base to form the accommodation cavity, the mounting hole is provided in the base, the liquid cooling plate is provided in the base, and the battery module is carried on the liquid cooling plate.

18. The battery pack according to claim 17, wherein the base comprises a bottom plate and a plurality of side plates, the plurality of side plates are provided on the bottom plate, and are connected end to end to form a positioning groove with the bottom plate, the liquid cooling plate is provided in the positioning groove, the battery module is partially located in the positioning groove for positioning, the cover covers and is connected to the plurality of side plates, and the accommodation cavity is formed between the cover and the positioning groove.

19. The battery pack according to claim 18, wherein the bottom plate and the liquid cooling plate are an integrally molded piece, or the bottom plate and the liquid cooling plate are two independent pieces connected to each other.

20. An energy storage device, comprising the battery pack according to claim 1.

* * * * *